United States Patent [19]

Öberg

[11] Patent Number: 5,963,348
[45] Date of Patent: Oct. 5, 1999

[54] METHOD FOR ASSIGNMENT OF WAVELENGTH CHANNELS IN AN OPTICAL BUS NETWORK

[75] Inventor: Magnus Öberg, Hägersten, Sweden

[73] Assignee: Telefonaktiebolaget LM Ericsson, Stockholm, Sweden

[21] Appl. No.: 08/875,733

[22] PCT Filed: Feb. 2, 1996

[86] PCT No.: PCT/SE96/00120

§ 371 Date: Sep. 16, 1997

§ 102(e) Date: Sep. 16, 1997

[87] PCT Pub. No.: WO96/24998

PCT Pub. Date: Aug. 15, 1996

[30] Foreign Application Priority Data

Feb. 6, 1995 [SE] Sweden .................................. 9500404

[51] Int. Cl.[6] ........................... H04B 10/24; H04B 10/20; H04J 14/02
[52] U.S. Cl. .......................... 359/114; 359/114; 359/124; 359/118
[58] Field of Search ................................... 359/114, 124, 359/118

[56] References Cited

U.S. PATENT DOCUMENTS

| | | | |
|---|---|---|---|
| 5,159,595 | 10/1992 | Flanagan et al. | 370/85.15 |
| 5,212,577 | 5/1993 | Nakamura et al. | 359/124 |
| 5,396,360 | 3/1995 | Majima | 359/133 |
| 5,500,857 | 3/1996 | Nakata | 370/50 |
| 5,663,818 | 9/1997 | Yamamoto et al. | 359/118 |

OTHER PUBLICATIONS

Forghieri, Fabrizio et al., "Reduction of Four–Wave Mixing Crosstalk in WDM Systems Using Unequally Spaced Channels," IEEE Photonics Technology Letters, vol. 6, No. 6, pp. 754–756, Jun. 1994.

Ghose, Kanad, "Performance Potentials of an Optical Fiber Bus Using Wavelength Division Multiplexing," SPIE, vol. 1849, Optical Interconnects, pp. 172–183, 1993.

Primary Examiner—Jason Chan
Assistant Examiner—Mohammad Sedighian
Attorney, Agent, or Firm—Burns, Doane, Swecker & Mathis, L.L.P.

[57] ABSTRACT

Channels are assigned in an optical bus network, including N nodes connected in series to one another by way of a pair of optical fibers, which facilitate simultaneous, two-way communication between all nodes of the bus network. A second pair of optical fibers, which directly connect the first and second nodes of the bus network, is adapted, after protective switching, to maintain the communication in the event of an interruption in the first pair of fibers. Each transmitter on the bus network transmits a certain network channel. Each receiver on the bus network receives a certain wavelength channel and allows other wavelength channels to pass to the next node. The channel which is received by a receiver in a node is entirely removed from the network, whereafter the channel can be re-used for transmission of information between two other nodes. In this way a minimum number of channels can be used for the communication between the nodes, and a minimum number of channels can be assigned to a node in an optical bus network in such a way that the channel assignment can be maintained in the event of an interruption at any point on the bus network.

6 Claims, 4 Drawing Sheets

| N/λ | 1 | 2 | 3 | 4 | 5 | 6 | 7 | 8 | 9 | 10 | 11 | 12 |
|---|---|---|---|---|---|---|---|---|---|---|---|---|
| A | 1 | 1 | 2 | 2 | 3 | 3 |   |   |   |   |   |   |
| B | 3 | 3 |   |   |   |   | 2 | 2 | 1 | 1 |   |   |
| C |   |   | 3 | 3 |   |   |   |   | 2 | 2 | 1 | 1 |
| D |   |   |   |   | 3 | 3 | 2 | 2 |   |   | 1 | 1 |
| E | 3 | 3 |   |   |   |   |   |   | 2 | 2 | 1 | 1 |
| F |   |   | 2 | 2 |   |   | 3 | 3 |   |   | 1 | 1 |
| G |   |   |   |   | 1 | 1 |   |   | 2 | 2 | 3 | 3 |
| A | X | X | X | X | X | X |   |   |   |   |   |   |
| B | X | X |   |   |   |   | X | X | X | X |   |   |
| C |   |   | X | X |   |   |   |   | X | X | X | X |

FIG. 3

|   | A | B | C | D | E | F | G |
|---|---|---|---|---|---|---|---|
| A | ---- | 2 | 4 | 6 | 1 | 3 | 5 |
| B | 1 | ---- | 10 | 8 | 2 | 7 | 9 |
| C | 3 | 9 | ---- | 12 | 10 | 4 | 11 |
| D | 5 | 7 | 11 | ---- | 12 | 8 | 6 |
| E | 2 | 1 | 9 | 11 | ---- | 12 | 10 |
| F | 4 | 8 | 3 | 7 | 11 | ---- | 12 |
| G | 6 | 10 | 12 | 5 | 9 | 11 | ---- |

FIG. 4

|   | B | C | D | E | F | G | A |
|---|---|---|---|---|---|---|---|
| B | ---- | 10 | 8 | 2 | 7 | 9 | 1 |
| C | 9 | ---- | 12 | 10 | 4 | 11 | 3 |
| D | 7 | 11 | ---- | 12 | 8 | 6 | 5 |
| E | 1 | 9 | 11 | ---- | 12 | 10 | 2 |
| F | 8 | 3 | 7 | 11 | ---- | 12 | 4 |
| G | 10 | 12 | 5 | 9 | 11 | ---- | 6 |
| A | 2 | 4 | 6 | 1 | 3 | 5 | ---- |

FIG. 5

METHOD FOR ASSIGNMENT OF WAVELENGTH CHANNELS IN AN OPTICAL BUS NETWORK

The present invention relates to a method for the assignment of wavelength channels to nodes in an optical bus network

BACKGROUND

In the sphere of telecommunications there is, in many cases, a need for a very high transmission capacity. Very fast data transmission can be achieved by using optical transmission by way of modulated light signals.

In order to send a plurality of light signals over a common optical medium, wavelength division multiplexing (WDM) is used. The signals are sent by way of independent wavelength channels, which can exist simultaneously in one optical fibre.

The optical transmission can be achieved in optical bus networks which comprise a number of optically connected nodes adapted for reciprocal communication. In an optical bus network comprising N nodes connected in series to one another, communication between nodes can be achieved in both directions by using at least two fibres for this communication, at least one fibre of which is used for each signal distribution direction. Each node communicates with each other node by way of a unique wavelength channel. This means that at least N−1 wavelength channels will exist simultaneously on each optical fibre.

A network which facilitates continuous communication between all nodes even following a fibre fracture between two nodes is already known from U.S. Pat. No. 5,159,595. The network comprises a number of nodes which are connected to one another in an circular configuration. This configuration is suited, for example, to wavelength division multiplexing.

When interruption occurs between two nodes, the wavelength channels which are used for communication to or from the said two nodes must change direction. The number of channels on the signal path used after interruption must then be increased In the known network additional channel assignment is facilitated in that each node comprises one transmitter port and one receiver port respectively, by means of which arbitrary wavelength channels can be added to or removed from the bus network. This solution, however, is both technically and economically disadvantageous.

SUMMARY

The method according to the invention relates to channel assignment in an optical bus network comprising N nodes connected in series to one another by way of two fibres. Each node communicates with each other node by way of a trasmitter and a receiver, so that each node comprises N−1 transmitters and N−1 receivers. Each transmitter in the network transmits a certain wavelength channel. Each receiver in the network receives a certain wavelength channel and allows other wavelength channels to pass on to the next node. The channel which is received by a receiver in a node is removed entirely from the network, whereafter the channel can be reused for transmission of information between two other nodes. In this way a minimum number of channels can be used for this communication between the nodes.

In order to avoid a fibre fracture in the bus network preventing all communication between certain nodes, an additional, geographically separated, pair of fibres is provided, which connect the first and last node of the bus network. This pair of fibres is activated if any of the ordinary fibres is damaged, the arrangement being designed to completely prevent communication past the point of interruption by way of the ordinary fibres. The network then acquires another configuration in such a way that the arrangement between the nodes must be changed and transmitter and receiver switched over.

One problem with previously known methods of channel assignment in optical bus networks is that an interruption of the above-mentioned type in the network generally leads to channels having to be re-assigned to each node, since channel collisions otherwise occur when the network configuration is changed.

The invention is intended to solve the above-mentioned problem in that it provides a new method for channel assignment in an optical bus network, by means of which a minimum number of channels is assigned to a node, in such a way tat the channel assignment can be retained in the event of an interruption at any point in the bus network. The channel assignment is performed so that transmission or reception between each specific pair of nodes always occurs on the same predetermined wavelength channels, regardless of whether the network configuration is modified by interruption in the bus network.

BRIEF OF FIGURES

FIG. 3 shows a completed channel assignment table, which is used in order to simplify channel assignment in a network having 7 nodes;

FIG. 4 shows a connection matrix for the channel assignment according to FIG. 3;

FIG. 5 shows a connection matrix for channel assignment according to FIG. 3, modified because of an interruption in the bus network.

DETAILED DESCRIPTION

The invention will now be described in detail with reference to the figures and in particular to FIGS. 3 and 4, which show how the channel assignment table and connection matrix can be used in order to simplify the channel assignment to the nodes in the configuration according to FIG. 1.

Figure 1:
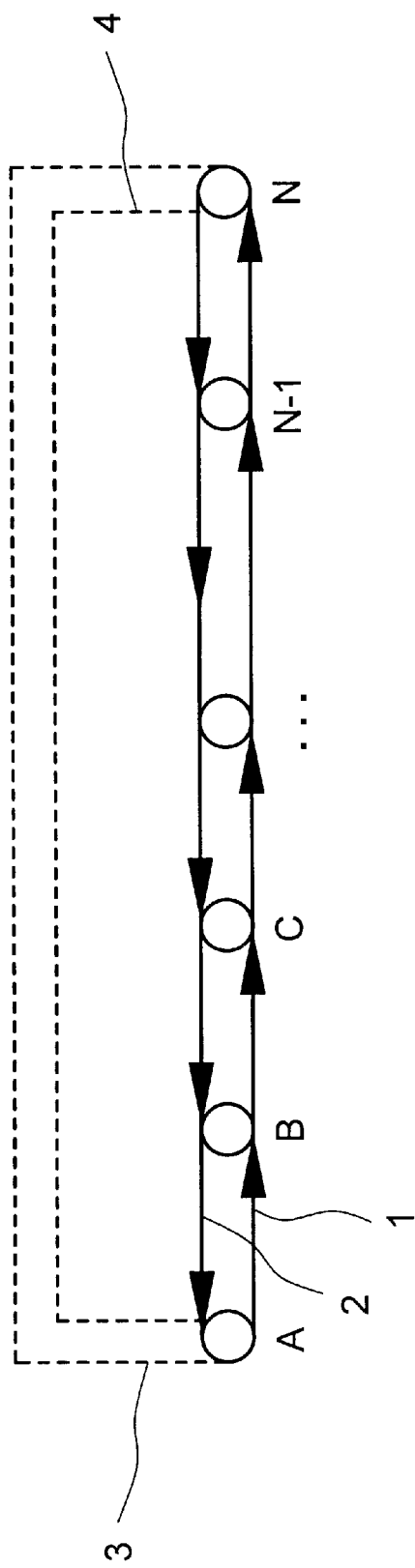
FIG. 1 shows a schematic diagram of a bus network with N nodes.

FIG. 1 shows a bus network with N nodes, which are connected in series by way of just two fibres. Each node comprises N−1 transmitters and N−1 receivers. The transmitters and receivers are connected to one or other of the two fibres respectively. A varying number of transmitters and receivers is connected to the first fibre, depending on where the node is located in the network. The first node, for example, has N−1 transmitters connected to fibre 1, all signals from which go to the right in the figure, and N−1 receivers connected to fibre 2, all signals from which go to the left in the figure. The last node, on the other hand, has N−1 receivers connected to fibre 1 and N−1 transmitters connected to fibre 2. The intermediate nodes have both transmitters and receivers connected to both the fibres.

Each transmitter in the network transmits on a certain wavelength, a so-called wavelength channel. Each receiver in the network receives a certain wavelength channel and allows other channels to pass on to the next node. Two channels of the same wavelength are never allowed to occur on any common section of fibre, since then the channels would not separate in the receiver. When channels are re-used in the bus network, each channel received in a node being directly re-used in the node, the channel which is received by a receiver in a node must be entirely removed from the optical bus network. The channel can thereafter be re-used for communication between further nodes in the bus network. By exploiting the re-use of channels in accordance with the method according to the invention, the number of channels required can be minimised to $N^2/4$ where N denotes an even number of nodes, and $(N^2-1)/4$ where N denotes an odd number of nodes in the network.

In the bus network described above, full communication is only obtained if all fibre sections between nodes are free of faults. In order to prevent a fibre fracture between a pair of nodes preventing all communication between the said nodes, an extra pair of fibres 3, 4 connects the first and last node in the bus network. This pair of fibres is geographically separated from the remainder of the optical bus network and can only be activated if any of the ordinary fibres is damaged. This extra pair of fibres 3, 4 is shown by dashed lines in FIG. 1.

Figure 2:
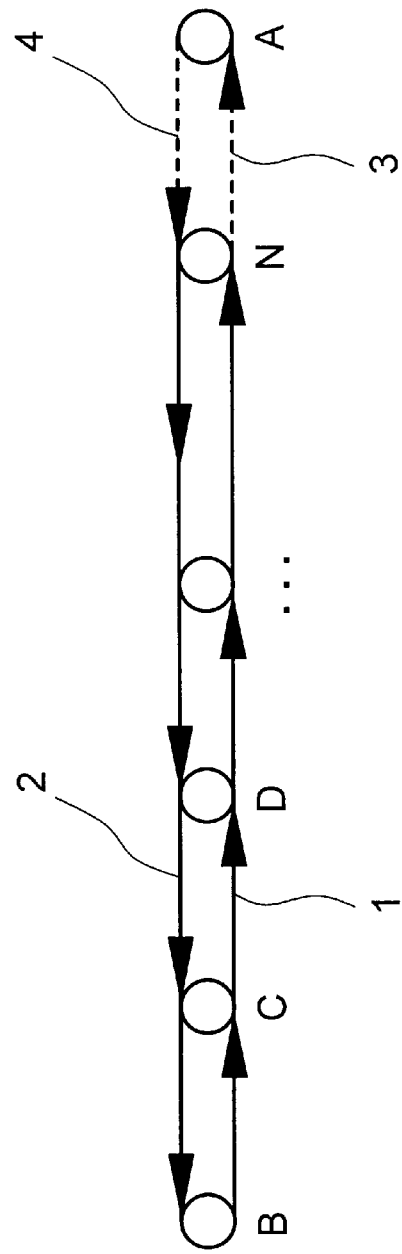
FIG. 2 shows a schematic diagram of a bus network with N nodes following fibre fracture between nodes A and B.

FIG. 2 shows the new configuration which is obtained following a fibre fracture between nodes A and B, after the additional pair of fibres has been activated. Node A is here situated last in the network for traffic going to the right and will thus have N−1 receivers connected to fibre 1 and N−1 transmitters connected to fibre 2. In node B the changes are considerably fewer, since it is only the transmitters and receivers for communication between node A and node B which need to be switched over between the fibres. Until the interruption occurred, the transmitter in node B, intended for communication with node A, was used for transmission over fibre 2, towards the left the figure. After interruption this transmitter must instead communicate with node A over fibre 1, towards the direction. The receiver in node B, intended for receiving from node A, must in the same way switch to receiving information from the fibre going to the left, fibre 2. In the same way a transmitter/receiver pair must be switched over in node C, a further one in node D etc. Interruption between nodes A and node B consequently leads to all transmitters and receivers in node A having to be switched over between the fibres, whilst only one transmitter/receiver pair needs to be switched over in other nodes.

Some of the transmitters and receivers in each node must therefore be switched over between the two fibres. A total of N network configurations can be obtained as a result of fibre fracture in various positions in the bus network, for which reason it has to be possible to perform an equal number of different switch-overs in the nodes of the bus network.

By means of the method according to the invention, however, it is possible to assign channels to nodes in the system in such a way that there is no need to perform a new channel assignment to the nodes as a result of changes of the node configuration. N−1 different wavelength channels are assigned to each node for communication with each other node. The channel assignment is performed so that two different wavelength channels are used for communication between two nodes; one channel for transmission from a first node to a second node and an other channel for receiving in the first node from the second node. Transmission to a node and reception from a node occur over different fibres. In each node there is a total of N−1 transmitters for each of its wavelength channels and an equal number of receivers of the same wavelength channels. A total of $N^2/4$ different wavelength channels exist in the network where N is an even number, and $(N^2-1)/4$ different wavelength channels where N is an odd number, because of channel re-use. In a network where N is an even number, each channel must be used for transmission from at least two nodes and where N is an odd number each channel must be used for transmission from at least three nodes.

In order to perform a wavelength assignment to nodes which can be maintained with any possible network configuration, the bus network, for channel assignment purposes, is regarded as a ring network comprising a single optical fibre for transmission in one direction, for example clockwise, along the ring network. N−1 different channels are assigned to each node. These channels are intended for both reception and transmission. The channels are assigned so that, where N is an odd number, they are assigned in pairs to a node for communication from this to each of the other nodes arranged clockwise in the ring network up to the distance (N−1)/2 nodes clockwise in the ring network, i.e. until N−1 channels are assigned for communication with a node arranged clockwise in the ring network. Where N is an even number, N−2 channels are in the same way assigned in pairs for communication from a node to each one of the nodes which are arranged at a distance up to (N/2)−1 nodes clockwise in the ring network and a further channel for communication with the node at the distance N/2 clockwise. The assignment is performed so that each wavelength channel occurs just once on each section of the ring network.

In order to then achieve a wavelength assignment on respective fibres, adapted to the actual bus network, with two optical fibres for transmission in different directions, transmitters and receivers must be assigned to appropriate fibres. In order to facilitate two-way communication between each pair of nodes, half of all transmitters and receivers must be induced to transmit in the other fibre direction. Which ones are to change direction is determined by the requirement that two channels of the same wavelength be never allowed to occur on the same section of fibre.

In the preferred embodiment of the invention a channel assignment table is used in order to establish the above-mentioned channel assignment by simple means. FIG. 3 shows an example of a channel assignment table in which the bus network is constructed from 7 nodes connected in series. The number of columns in the table corresponds to the minimum number of channels, that is wavelengths, which must be used in this bus network. The number of rows represents the number of nodes in the bus network. The table has been supplemented with (N−1)/2 and N/2 rows respectively so that in the assignment, allowance can be made for the fact that the first and last nodes respectively in the bus network may, in the event of protective switching, be connected to one another by way of the additional pair of fibres 3, 4 and must therefore be treated as nodes arranged adjacent to one another. The table accordingly has 3N/2 rows if N is an even number and (3N−1)/2 rows if N is an odd number.

The channel assignment table is filled in by assigning N−1 channels to each row in the network. For the first row in the table, corresponding to node A, these channels can be selected at random. In connection with the channel selection, marking is undertaken showing how these channels will coincide with the selection performed for the next few rows. In each row just two of the channels must coincide with the channels selected in the next row, two with the channels selected in the next but one row etc. up to a row of distance (N−1)/2 rows from the first row, if N is an odd number, and (N/2)−1 rows if N is an even number. In the case of channel assignment in a bus network with an even number of nodes one channel must furthermore coincide with the row situated N/2 rows further down the table. The channel assignment is marked in the table by entering the row distance to that row in the table in which the same channel recurs, in the position in the first row of the table corresponding to a certain channel. In the embodiment shown in FIG. 3 these markings have been made by entering the FIGS. 1, 2 and 3, which correspond to the distance to the rows in which the channels recur and are therefore to be marked again. The channels selected are also marked in the row at the end of the table which represents node A. In the channel assignment table shown in FIG. 3, this marking is denoted by X, since the selected channels coincide completely with those selected in the first row of the table, in which the distance to the nearest neighbour has already been established.

The channel selection made in the first row of the table affects the channel selection for the next (N−1)/2 rows if N is an odd number or (N/2)−1 rows if N is an even number, since these rows, according to the channel assignment method according to the invention, must have certain common channels. The channels which are consequently fixed in a certain row are in turn further used either in the next row in the arrangement or the next but one row etc. In this assignment the way in which the channel is used can be freely selected provided that there are never more than two channels marked for a certain row distance in the table. A wavelength must be used at least twice in the table if N is an even number and three times in the table if N is an odd number, that is to say a corresponding number of markings must occur at least in each column. In filling in the table, no wavelength can be used more than $$P\lambda + 2R\lambda \leq N(N-1) \text{ if } N \text{ is an even number} \quad (1)$$

$$P\lambda + 3R\lambda \leq N(N-1) \text{ if } N \text{ is an odd number} \quad (2)$$

where $P\lambda$ represents the total number of wavelengths already placed, that is the number of markings in the rows of the table already filled in, and the number of wavelengths in the hypothetically completed wavelength column in preparation; $R\lambda$ is the number of wavelength columns not yet used. The terms given above make it possible to detect at an early stage whether channels are being incorrectly assigned in the table.

When the channel assignment has been performed as can be predicted on the basis of the channel assignment in row A, channel assignment is performed in the same way for the other rows. When the table is completely filled in precisely N−1 channels will have been assigned to each row. Since the rows of the table correspond to nodes in the bus network the channel assignment table provides a definition of which channels are used for communication on each node. Each channel is reused directly on each node; transmitters and receivers in the respective node will therefore be intended for the same channels.

The channel assignment on respective fibres is fixed by transferring the result from the channel assignment table to a connection matrix. The said matrix contains N rows and N columns, which correspond to the number of nodes in the bus network. In order to clarify this connection, rows and columns are given with corresponding node designation. In the connection table shown in FIG. 4 having seven nodes, the matrix contains rows A–G and columns A–G. The connection matrix is used to clarify the nodes' reciprocal communication and to make clear which fibre is communicating as transmitter or receiver for a certain channel. A channel indication in row A, column B corresponds, for example, to the channel which is used for communication from node A to node B by way of fibre 1; the channel indication in row B, column A then corresponds to the channel which is used for communication from node B to node A by way of fibre 2. The positions in the matrix at which both a column and a row symbolise one and the same node are not assigned any value, since the nodes in the bus network do not communicate with themselves. The diagonal of the connection matrix will therefore be left empty.

The wavelengths which, according to the channel assignment column, will be used for communication between two nodes situated adjacent to one another are transferred to the connection matrix and entered on either side of the matrix diagonal. These are to be placed just below and just above the diagonal and in the bottom left-hand corner and in the upper right corner. The placing in relation to the diagonal is unimportant in this case. This means that the channels which are used for the connection between the first and second nodes, that is node A and B, are entered in the upper left-hand corner of the connection matrix in row A, column B and row B, column A respectively. The channels which are used for the connection between the last two nodes are entered in the bottom right-hand corner of the matrix. The channels entered on either side of the diagonal correspond to the channels which are used for transmission on each fibre.

The channels which will be used for communication between nodes arranged next but one in the bus network are entered in the same way. These channels are filled in as close as possible to the matrix diagonal; for a pair of channels marked in the channel assignment table, one channel is entered on each side of the matrix diagonal. For the outer nodes in the network configuration corresponding values are entered on each side of the diagonal, at those positions which are situated as far away as possible from the diagonal. If any wavelength channel is used more than once, this channel is to be placed on the same side of the connection matrix diagonal as in earlier placings. In that position in the matrix indicating the relationship between the first and last node, that is the position in the bottom left-hand corner and in the upper right-hand corner, however, the opposite applies, that is to say, if the wavelength channel in question has occurred previously in the matrix, it will in this case be placed on the opposite side of the diagonal. A channel value may never occur more than once in the same row or same column, since this channel would then occur several times on the same section of fibre.

Corresponding procedures apply for transferring the other channels from the channel assignment table to the connection matrix. In the completed connection matrix a channel value may never occur more than once in the same row or same column.

The completed connection matrix provides information on which channels are used for a connection between two nodes and information on how transmitters and receivers in a node are to be assigned between the fibres going to the right or the left respectively.

FIG. 3 and FIG. 4 show an example of a completed channel assignment table and connection matrix respectively for a bus network with N nodes where N=7. In the channel assignment table shown in the figure, the channels 1–6 have initially been arbitrarily assigned to node A. The assignment establishes that channel 1–2 is to be used for communication with node B, that is with the nearest node; channel 3–4 for communication with node C, that is the next but one node; and channel 5–6 for communication with node D, that is the node N/2 positions from node A. Due to the channel assignment performed in node A, the channel selection is limited in the other nodes. Since, in the method according to the invention, each channel is directly reused after receiving in a node, channel 1–2 must be used for communication from node B, channel 3–4 for communication from node C and channel 5–6 for communication from node D. The node with which node D communicates by way of channel 5 and 6 has, however, been selected at random, the same applying to the nodes with which B and C communicate.

Apart from the limitations which arise due to the selection of channels on node A, the channels on node B can be selected arbitrarily. In the same way as for node A, this channel selection has affected which channels can be selected on node C, D and E. The table shown in the figure is correctly completed in accordance with the conditions stated above, which means tat each wavelength is used at least twice and that no wavelength on any level in the table, that is to say with any number of completed rows, has been used more than the limit specified in (2). The channels are furthermore assigned so that each node has just two channels for communication with the next node down in the table; just two channels for communication with the next node but one down in the table and two channels for communication with the node (N–1)/2 (N=7) positions from each node.

By transferring the result in the channel assignment table according to FIG. 3 to a connection matrix in the way described above, information is obtained on how each node will communicate with each other node. Thus, from the connection matrix shown in the figure one of the channels marked in row A is for communication with the nearest neighbour, that is between node A and node B, located in row A, column B; the second channel is correspondingly located in row B, column A. The channels marked in row A in the channel assignment table for communication between node A and node C are located in row A, column C and row C, column A respectively in the connection table. A corresponding procedure has been performed for all other values in the channel assignment table, as can be seen from a comparison of FIG. 3 and FIG. 4. The channels which are given above the connection matrix diagonal are used, for example, for communication over the fibres going to the right, the channels which are given below the diagonal are then used for communication over the second fibre.

In the event of an interruption in the bus network, the channels for transmitting and receiving between various nodes must be re-assigned between the two fibres. This re-assignment can be easily achieved by moving columns and rows in the connection matrix so that the column and row arrangement in the connection matrix represents the node arrangement in the actual bus network. The first node in the actual bus network will therefore always represent the first row and first column respectively in the connection matrix. The case which occurs in the event of an interruption between node A and node B is illustrated in FIG. 5. Following the interruption node B will become the first on the bus network. Node A is still connected to the other nodes, but this connection is maintained by way of the said extra pair of fibres 3, 4. Following connection by way of the extra pair of fibres, node A is last on the bus network; the row and column in the connection matrix intended for the channel assignment on node A must therefore represent the last row and last column respectively in this matrix. The same naturally occurs in the event of fracture at other positions on the fibre network.

Figure 6:
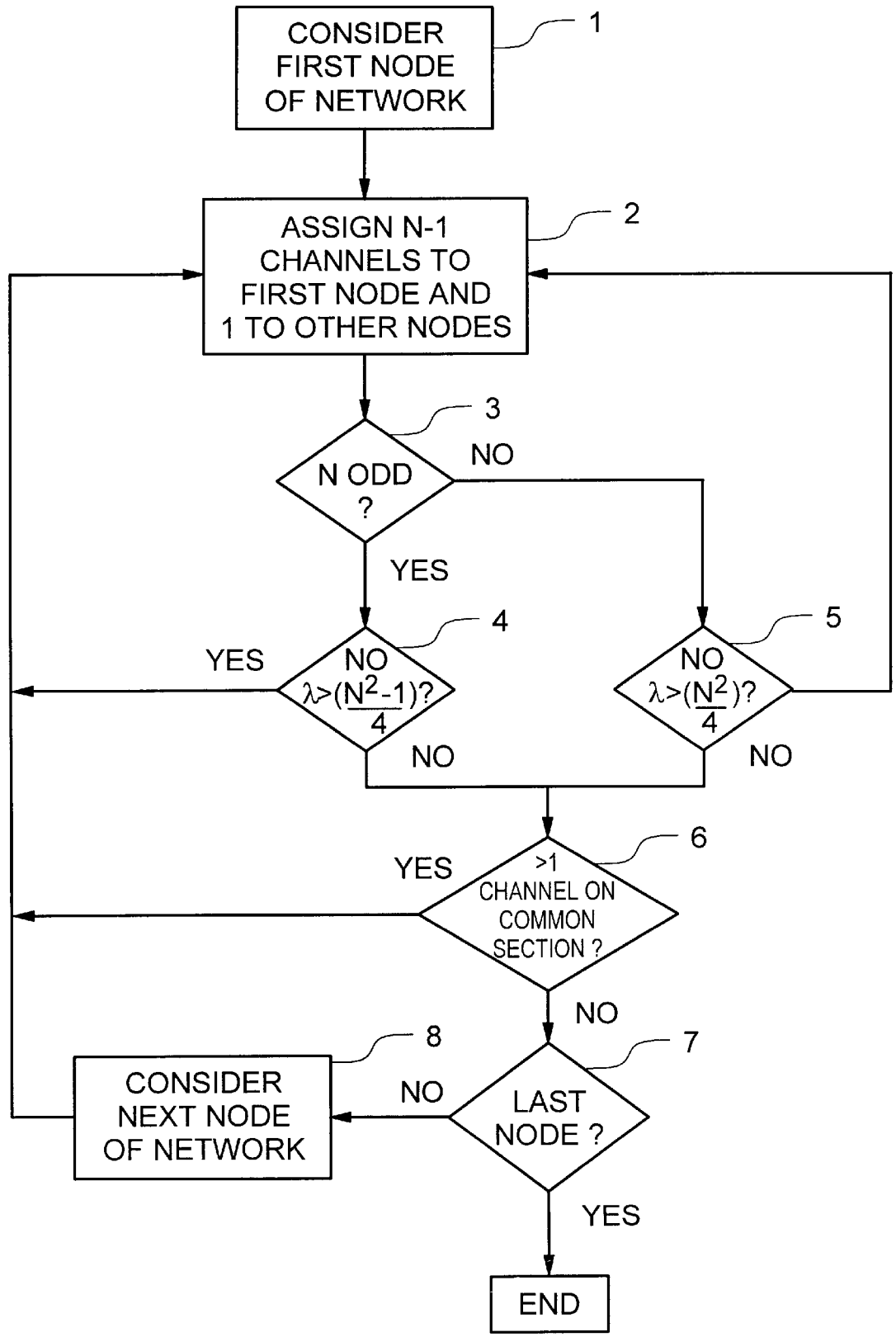
FIG. 6 shows a flow diagram for the method according to the invention.

FIG. 6 shows a flow diagram for the channel assignment to each node in accordance with the method according to the invention. The various steps have corresponding reference designations in the flow diagram shown in FIG. 6. The following steps are performed in the channel assignment:
1. Consider the first node of the bus network.
2. Assign N–1 channels on the fibres for transmission from the node in question, 1 channel to each other node in the network. Re-use only those channels which in the node are received from other nodes.
3. Proceed to step 4 if N is an odd number and step 5 if N is an even number.
4. Proceed to step 6 if the total number of different wavelengths does not exceed $(N^2-1)/4$, otherwise return to step 2 and re-do the assignment for this node.
5. Proceed to step 6 if the total number of different wavelengths does not exceed $N^2/4$, otherwise return to step 2 and re-do the assignment for this node.
6. Return to step 2 and re-do the assignment if more than one channel of the same wavelength is used on a common section of the fibre, otherwise proceed to 7.
7. The channel assignment is complete if the node in question represents the last node on the bus network. Check whether this is the case. Go to step 8 if nodes still remain to which channels have not been assigned.
8. Consider the next node on the bus network, repeat steps 2–7 for this node.

Where there is a large number of nodes, the channel assignment is considerably simplified by using the channel assignment table described earlier, which is based on the principles shown in the flow diagram.

The invention is not limited to the above-mentioned embodiments but can be varied within the framework of the following patent claims.

What is claimed is:

1. Method for assigning wavelength channels in an optical bus network comprising N optical nodes and two pairs of optical fibres, the first of which is adapted to facilitate simultaneous, two-way communication between all nodes of the bus network, whilst the second is adapted, after protective switching, to maintain this communication in the event of an interruption in the first pair of fibres, wherein, the channel assignment is performed with re-use of channels, a total of $(N^2-1)/4$ different wavelength channels being assigned to transmitters and receivers respectively in the bus network if N is an odd number and a total of $N^2/4$ different wavelength channels if N is an even number;

N–1 different wavelength channels are assigned to transmitters in respective nodes for transmission by way of any of the optical fibres to receivers for corresponding wavelengths in each of the other nodes so that just one wavelength channel per fibre direction is assigned to each node for communication with each other node in the bus network; and the channel assignment is performed in such a way that two channels of the same wavelength are never used on any common section of an optical fibre in the bus network in each network configuration which is produced by an interruption at any random point on the bus network.

2. Method according to claim 1, wherein the same wavelength channels, which are never used for communication with the same nodes, are assigned to transmitters and receivers in one and the same node.

3. Method according to claim 1, wherein transmitters connected to the optical fibre for communication in the first fibre direction or the optical fibre for communication in the second fibre direction are assigned channels which are received on corresponding fibres, in such a way that in each node the number of channels re-used on respective fibres is equal to the number of nodes which separate the node from the nearest end of the bus network.

4. Method for assigning wavelength channels in an optical bus network comprising N optical nodes and two pairs of optical fibres, the first of which is adapted to facilitate simultaneous, two-way communication between all nodes of the bus network, whilst the second is adapted, after protective switching, to maintain the said communication in the event of an interruption in the first pair of fibres, wherein the channel assignment is performed with re-use of channels, transmitters and receivers respectively being assigned a total of $(N^2-1)/4$ different wavelength channels on the bus network if N is an odd number and a total of $N^2/4$ different wavelength channels if N is an even number;

N−1 channels are assigned to each node on the network;

the bus network is regarded for channel assignment purposes as a ring network comprising an optical fibre intended for transmission in one direction, the channels in each node being reserved in pairs for communication with other nodes in one direction of the bus network in such a way that each of the channels reserved for any node is re-used at least once if N is an even number and at least twice if N is an odd number; that each wavelength channel occurs just once on each section of the ring network; and that each channel on the bus network assigned to the ring network is used for transmission to and from a node.

5. Method for assigning wavelength channels in an optical bus network comprising N optical nodes and two pairs of optical fibres, the first of which is adapted to facilitate simultaneous, two-way communication between all nodes of the bus network whilst the second is adapted, after protective switching to maintain the said communication in the event of an interruption in the first pair of fibres, wherein the same channels are assigned to the final nodes of the bus network as are assigned in the initial nodes of the bus network, so that the bus network, for the purpose of channel assignment, is regarded as a ring network;

in a first node N−1 different wavelength channels are reserved in pairs in common with the other nodes arranged downstream on the bus network, up to the distance (N−1)/2 nodes if N is an odd number and (N/2)−1 nodes if N is an even number, together with a further channel for communication with the node at the distance N/2 if N is an even number;

in a second node, for which one or two common communication channels have been reserved in the first node and which are situated at the greatest distance from the first node, the same channel or channels are reserved in common with a third node in the same direction on the bus network, which third node is, at most, situated at the same distance from the second node as the latter is from the first node the channel assignment is performed in the same way for the third node and nodes following this until the first node of the bus network is reached;

channels are in the same way reserved in common between each of the nodes following the first node on the bus network until each node has been assigned N−1 wavelength channels and a total of $(N^2-1)/4$ separate wavelengths have been assigned to all nodes if N is an odd number and a total of $N^2/4$ separate wavelengths have been assigned to all nodes if N is an even number; and the channels assigned to each node are distributed for transmitting and receiving on respective fibres so that two channels of the same wavelength are never used on any common section of an optical fibre on the bus network in a network configuration and that a node never both transmits and receives information from a certain other node by way of the same wavelength channels.

6. Method according to claim 2, wherein transmitters connected to the optical fibre for communication in the first fibre direction or the optical fibre for communication in the second fibre direction are assigned channels which are received on corresponding fibres, in such a way that in each node the number of channels re-used on respective fibres is equal to the number of nodes which separate the node from the nearest end of the bus network.

\* \* \* \* \*